United States Patent
Mansfield

(10) Patent No.: US 12,368,723 B2
(45) Date of Patent: Jul. 22, 2025

(54) METHOD AND SYSTEM FOR MANAGING SECURE IoT DEVICE APPLICATIONS

(71) Applicant: Jabil Inc., St. Petersburg, FL (US)

(72) Inventor: Stephen Mansfield, St. Petersburg, FL (US)

(73) Assignee: Jabil Inc., St. Petersburg, FL (US)

( * ) Notice: Subject to any disclaimer, the term of this patent is extended or adjusted under 35 U.S.C. 154(b) by 288 days.

(21) Appl. No.: 17/642,272

(22) PCT Filed: Sep. 11, 2020

(86) PCT No.: PCT/US2020/050314
§ 371 (c)(1),
(2) Date: Mar. 11, 2022

(87) PCT Pub. No.: WO2021/050816
PCT Pub. Date: Mar. 18, 2021

(65) Prior Publication Data
US 2022/0303283 A1  Sep. 22, 2022

Related U.S. Application Data

(60) Provisional application No. 62/899,371, filed on Sep. 12, 2019.

(51) Int. Cl.
*H04L 65/75* (2022.01)
*G06F 21/60* (2013.01)
(Continued)

(52) U.S. Cl.
CPC ........ *H04L 63/126* (2013.01); *H04L 63/0281* (2013.01)

(58) Field of Classification Search
CPC ........................... H04L 63/126; H04L 63/0281
(Continued)

(56) References Cited

U.S. PATENT DOCUMENTS

2016/0219060 A1* 7/2016 Karunakaran ........ H04L 63/102
2017/0006135 A1* 1/2017 Siebel .................... H04L 67/53
(Continued)

FOREIGN PATENT DOCUMENTS

CN  108881455 A   11/2018
CN  112534852    * 3/2021
(Continued)

OTHER PUBLICATIONS

Ankush B. Pawar; A Survey on IoT Applications, Security Challenges and Counter Measures; IEEE:2016; pp. 294-299.*
(Continued)

*Primary Examiner* — Monjur Rahim
(74) *Attorney, Agent, or Firm* — Young Basile Hanlon & MacFarlane, P.C.

(57) ABSTRACT

Methods and systems for managing secure IoT data are described. A docker container system for managing secure Internet of Things (IoT) device data includes a machine control container configured to collect IoT device data from device data producing machines, a translation container configured to translate collected IoT device data into a common semantic format, client-specific container applications configured to aggregate, filter, and process translated IoT device data to generate processed IoT device data, and send the processed IoT device data to at least one of client applications and data storage, and a secure container proxy service configured to apply security-based protocols to the processed IoT device data. The client-specific container applications deployed absent the security-based protocols.

20 Claims, 6 Drawing Sheets

(51) Int. Cl.
*G06F 21/62* (2013.01)
*H04L 9/32* (2006.01)
*H04L 9/40* (2022.01)
*H04L 67/02* (2022.01)
*H04L 67/125* (2022.01)
*H04L 67/564* (2022.01)

(58) Field of Classification Search
USPC .......................................................... 726/14
See application file for complete search history.

(56) References Cited

U.S. PATENT DOCUMENTS

| | | | |
|---|---|---|---|
| 2017/0242689 A1* | 8/2017 | Cheng | G06F 8/41 |
| 2018/0191729 A1* | 7/2018 | Whittle | H04L 63/0227 |
| 2018/0191867 A1* | 7/2018 | Siebel | G06N 20/20 |
| 2018/0300124 A1* | 10/2018 | Malladi | H04L 67/561 |
| 2019/0149618 A1* | 5/2019 | Tsai | H04L 67/02 |
| | | | 709/202 |
| 2019/0266496 A1* | 8/2019 | Florissi | G06Q 20/065 |

FOREIGN PATENT DOCUMENTS

| | | |
|---|---|---|
| WO | 2017035536 A1 | 3/2017 |
| WO | 2017165713 A1 | 9/2017 |
| WO | 2018125989 A2 | 7/2018 |
| WO | 2018186373 A1 | 10/2018 |

OTHER PUBLICATIONS

Muhammad Aslam Jarwar et al: "Microservices in Web Objects Enabled IoT Environment for Enhancing Reusability", Sensors, vol. 18, No. 2, Jan. 1, 2018 (Jan. 1, 2018), pp. 1-21, XP055766634, DOI: 10.3390/s18020352.

Aazam Mohammad et al: "Fog Computing and Smart Gateway Based Communication for Cloud of Things", 2014 International Conference on Future Internet of Things and Cloud, IEEE, Aug. 27, 2014 (Aug. 27, 2014), pp. 464-470, XP032704042, DOI: 10.1109/FICLOUD.2014.83 [retrieved on Dec. 12, 2014].

* cited by examiner

METHOD AND SYSTEM FOR MANAGING SECURE IoT DEVICE APPLICATIONS

CROSS-REFERENCE TO RELATED APPLICATION(S)

This application is a national stage entry of International Patent Application Serial No. PCT/US2020/050314, filed Sep. 11, 2020, which claims priority to U.S. Provisional Application Ser. No. 62/899,371, filed Sep. 12, 2019, the entire disclosures of which are incorporated herein.

TECHNICAL FIELD

This disclosure relates to collection and security of data.

BACKGROUND

Internet of Things (IoT) devices have significantly improved the gathering of manufacturing production data. This data is used in many applications focused on improving production flow, process improvement and defect reduction. This data has significant monetary value as it can dramatically reduce production costs and improve production throughput. Companies vigorously protect this data as it represents a significant competitive advantage. Customers are also demanding protection of this data as it is sensitive proprietary product information.

Collection of manufacturing data and process information is becoming critical to a company's agility and competitiveness. This data and process information is often used in Statistical Process Control (SPC) and descriptive, diagnostic, predictive and prescriptive analytics. These analytic methods can give tremendous insight to more efficient manufacturing processes. More efficient processes can increase production throughput, lower manufacturing costs and improve quality.

Also important is the need to securely protect the data from unauthorized access and misappropriation. This applies to both companies and customers of companies. Factory production data has significant proprietary process knowledge and monetary value.

The complexity and assurance of security is a complex problem. Although industry standards exist, developing code that meets industry security standards and has strong security assurance can be very difficult. Testing secure code can be even more difficult. A simpler way for software developers not knowledgeable with sophisticate security technology must be found.

SUMMARY

Disclosed herein are methods and systems for managing secure IoT device applications.

In implementations, a docker container system for managing secure Internet of Things (IoT) device data includes a machine control container configured to collect IoT device data from device data producing machines, a translation container configured to translate collected IoT device data into a common semantic format, client-specific container applications configured to aggregate, filter, and process translated IoT device data to generate processed IoT device data, and send the processed IoT device data to at least one of client applications and data storage, and a secure container proxy service configured to apply security-based protocols to the processed IoT device data. In implementations, the client-specific container applications are deployed independent of the security-based protocols. In implementations, the client-specific container applications are absent security-based protocols. In implementations, the security-based protocols include encryption protocols, authentication protocols, and authorization protocols. In implementations, the client-specific container applications include a real-time streaming interface configured to send security applied IoT device data in real-time. In implementations, the client-specific container applications include a messaging interface configured to send messages and send security applied IoT device data to the data storage. In implementations, the secure container proxy service includes a forward proxy service configured to apply the security-based protocols to communication traffic exiting the docker container system. In implementations, the secure container proxy service includes a forward proxy service configured to apply the security-based protocols to communication traffic entering the docker container system. In implementations, the communication traffic includes at least IoT device data, in-bound client requests, and out-bound client requests.

In implementations, a method for managing secure Internet of Things (IoT) device data includes collecting, using machine control containers, IoT device data from device data producing machines, wherein each data producing machine has an associated machine control container, translating, using a translation container, collected IoT device data into a common semantic format, aggregating, filtering, and processing, using client application containers, translated IoT device data to generate processed IoT device data, applying security-based protocols, using a secure container proxy service, to the processed IoT device data to generate security-applied IoT device data, and sending, via communication interfaces, the security-applied IoT device data to a client target. In implementations, the aggregating, filtering, and processing and the applying security-based protocols are done by different docker containers. In implementations, the security-based protocols include encryption protocols, authentication protocols, and authorization protocols. In implementations, the sending is real-time streaming. In implementations, the applying security-based protocols is done for communication traffic exiting and entering the docker container system. In implementations, the communication traffic includes at least IoT device data, in-bound client requests, and out-bound client requests.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
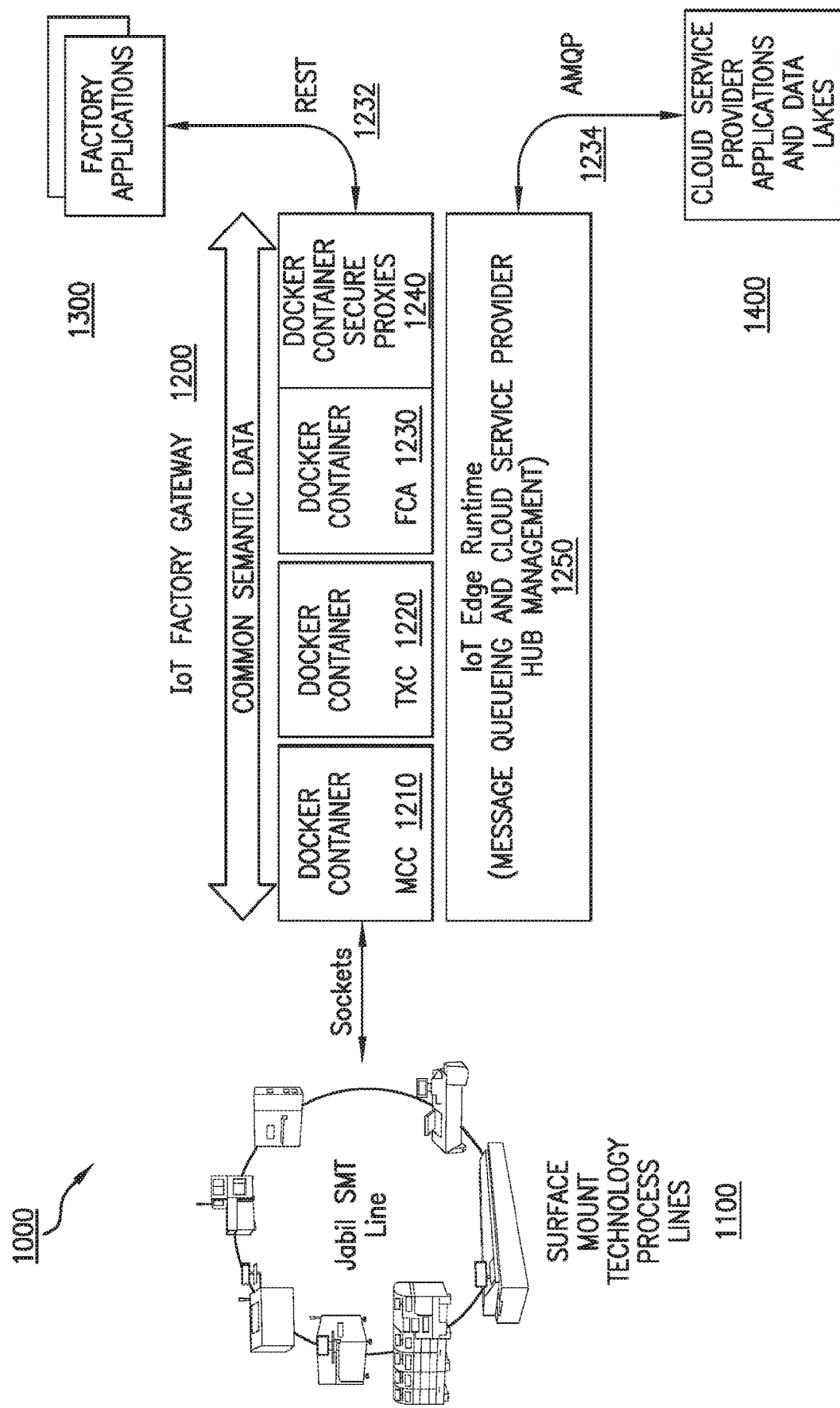
FIG. 1 is a block diagram of an example of an IoT Factory Gateway (IFG) data architecture.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration.

Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods, devices and systems for managing secure IoT device applications. An IoT Factory Gateway (IFG) is a collection device which can collect large amounts of manufacturing data across whole factories. IFG makes use of Secure Container Proxy Service (SCPS) as described herein to provides seamless encryption, authentication and authorization security for Docker based application containers (docker may be used herein without capitalization). SCPS is a method for writing secure code without the need for understanding complex security software algorithms. SCPS allows software engineers to write code that is focused on the business problem they are trying to solve without the need to worry about the complexity of security, encryption, authentication methods and data access control. All are handled automatically by using SCPS.

IFG allows factories to collect real-time data from virtually any equipment found in a typical factory. It is a highly flexible architecture that allows factories to easily collect real-time IoT data from virtually any machine.

FIG. 1 is a block diagram of an example of an IFG data architecture 1000. In Implementations, the IFG data architecture 1000 is a docker microservices based architecture. Docker is a set of coupled software-as-a-service (SaaS) and platform-as a service products that use operating-system-level virtualization to develop and deliver software in packages called containers. Containers are isolated from each other and bundle their own software, libraries and configuration files. They communicate with each other through well-defined channels. Containerization enables simple well-defined services that can be quickly designed, developed, tested and deployed.

IFG allows real-time data collection of many machines including older legacy machines where the interfaces may be proprietary or use older outdated industry standards. A surface mount technology (SMT) line is described in a factory for purposes of illustration and any factory or process line can be used without limiting the scope of the specification and claims. The IFG data architecture 1000 can include machines 1100 for a surface mount technology (SMT) line, an IFG 1200, a factory Manufacturing Execution Systems (MES) 1300, and a cloud analytics applications and data lake 1400. The IFG 1200 extracts data from the machines 1100, converts the data to a common semantic format, aggregates, and securely pushes data to the factory applications 1300 and cloud-based data lakes 1400.

A Machine Control Container (MCC) 1210 is the primary interface to the machine. The MCC 1210 handles all protocol and data capture for each specific machine. Many legacy machines use proprietary interfaces. The MCC 1210 handles both proprietary and industry standard interfaces, which is very helpful for factories that have a lot of legacy equipment. Once the MCC 1210 captures the data it is sent to the Translation Container (TXC) 1220.

The Translation Container (TXC) 1220 receives data from the MCC 1210 and converts the data to an application common data format. Each machine 1100 has proprietary data types and labels. The TXC 1220 extracts the data and creates standard JSON key/value pairs. For certain machine classes, like the Pick and Place and Automated Optical Inspection (AOI) machines, the TXC 1220 creates a common data semantic model so applications that use these machines do not have to have knowledge of the unique machine data types. Once the TXC 1220 completes its data translation it passes the data on to the Factory Container Application (FCA) 1230.

The FCA 1230 is a highly flexible data aggregator. Many factory applications require specific real-time data for manufacturing process control. The FCA 1230 aggregates, filters, processes, and rapidly sends data to other applications. The FCA 1230 has two data channels: HTTP REST interface 1232, and Streaming Advanced Message Queuing Protocol (AMQP) interface 1234.

The HTTP REST interface 1232 is for fast real-time streaming applications. The HTTP REST interface 1232 interface can deliver data in 10's of milliseconds to factory applications that require real-time data delivery.

The FCA Streaming AMQP interface 1234 is for cloud-based Data Lake Archival storage. Data Lake organization is often Temporal Hierarchical where recent data can be accessed quickly and older infrequently accessed data is stored in slower cheaper data storage. This format is often used by batch applications that can tolerate slower cloud-based data delivery. In implementations, data from an IoT edge runtime module 1250 is sent via the FCA Streaming AMQP interface 1234.

The IFG data architecture 1000 also allows for quick and easy development and deployment for factory development teams. The IFG 1200 provides the data plumbing and the FCA 1230 aggregates and publishes data to various factory applications. Data is routed to the FCA 1230 using simple data routing statements and does not require changes to the containers. The FCA 1230 is the data pipeline to factory MES, Enterprise Resource Planning System (ERP) and Information Management System (IMS), and large analytic data lake storage.

The Secure Proxy Containers (SPC) 1240 provides the security framework for the platform. The FCA 1230 are designed to be easy to develop, test, and deploy. They are expected to be developed by factory engineering software developers who may not be experts in data security. The SPC 1240 utilizes a set of proxies that perform all HTTP to HTTPS conversion and all authentication and authorization utilizing secure OAuth2 tokens. OAuth stands for Open Authorization for access delegation highlighted in RFC 6749. Factory software engineers only need to write simple HTTP communications software with no regard for security. The SPC 1240 handle all encryption, authentication and authorization.

Figure 2:
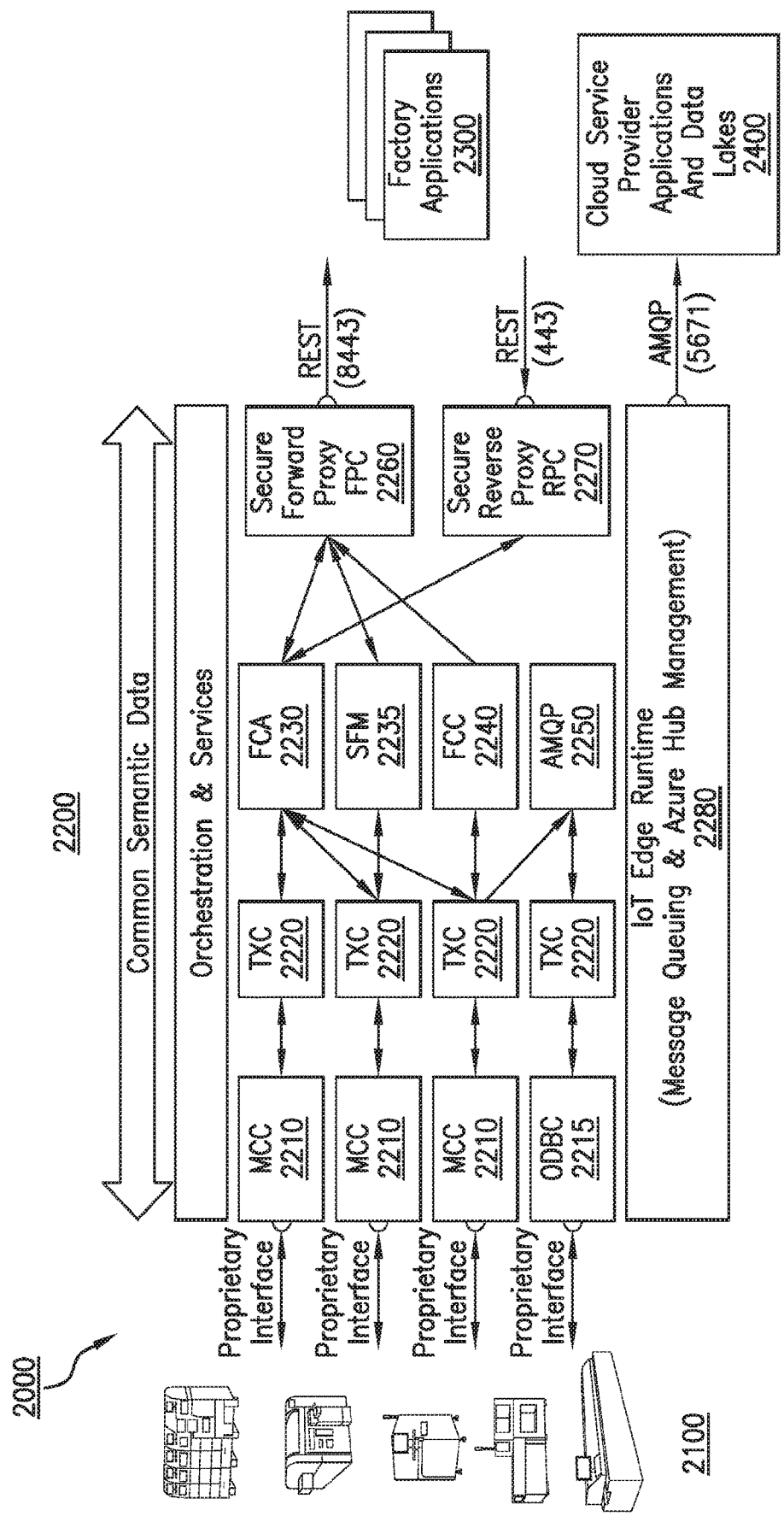
FIG. 2 is a block diagram of an IFG implementation in accordance with embodiments of this disclosure.

FIG. 2 is a block diagram of an IFG architecture 2000. The IFG architecture 2000 includes machines 2100, IFG 2200, factory applications 2300, and a cloud analytics applications and data lake 2400. The IFG 2200 includes MCC containers 2210, ODBC 2215, TXC containers 2220, FCA containers 2230, SFM 2235, FCC 2240, AMQP 2250, secure forward proxy FPC 2260, secure reverse proxy RPC 2270, and an IoT Edge runtime module 2280.

In the IFG architecture 2000, each machine 2100 has its own MCC 2210 and TXC 2220. The MCC 2210 handles the machine interface and the TXC 2220 converts the machine data to a common data format. Each FCA 2230 is responsible for aggregating data and forwarding it to its respective factory application. Each FCA 2230 can receive data streams from one or more TXC's 2220. The SCPSs (collectively the secure forward proxy FPC 2260 and secure reverse proxy RPC 2270) capture all HTTP application packets and performs all HTTP to HTTPS conversion and secure token insertion.

The SCPSs perform all IFG security functions including encryption, authentication and authorization. There are two SCPS services, a Forward Proxy Secure Services (FPSS) provided by the secure forward proxy FPC 2260 and a Reverse Proxy Secure Services (RPSS) provided by the secure reverse proxy FPC 2270. These types of services are unique for this docker application and dramatically improve all aspects of IoT, factory applications, and factory machine security. Using industry standard data security technology, the SCPS implementation enables very strong security and provides a new and critical security component for the factory machines called Machine Encapsulation Security (MES).

OAuth2 Security

One of the key security components is OAuth2 secure delegation access. OAuth2 is an industry standard used by many major web service providers. It is a secure server that delegates authentication and authorization credentials to other applications. OAuth2 uses encrypted tokens, called JSON Web Tokens (JWT), to pass authentication and authorization credentials to clients. OAuth2 has many delegation services. The IFG architecture 2000 and the IFG 2220 uses Client Credential Grant services.

A unique OAuth2 account is set up for each application that uses the IFG 2200. An OAuth2 client ID and secret is created for the client when the account is created. These credentials are securely stored in both OAuth2 and client token credentials library. The client uses these credentials to request delegation tokens. The delegation token is an industry standard encrypted token created by an OAuth2 service. The token includes the client ID, scope, Time-To-Live (TTL), and a nonce.

The client ID validates the owner of the token. The client ID provides authentication. The scope defines the client rights to access web services. The scope defines authorization. The TTL defines when the token has expired. For greater security tokens have a finite life span. A new one must be reissued once expired. The nonce is a random number used to make sure that no two encrypted tokens have the same signature. The delegation token is encrypted using the OAuth2 service private X.509 certificate. This eliminates the possibility of token tampering. The web service can only decrypt the token using the OAuth2 server's public key.

Tokens have a finite time that they are valid. The tokens TTL defines when the token is no longer valid. The TTL is anywhere from several minutes to several days. When a token has timed out the client requests a new one using its client ID and secret. Faster timeouts provide greater security. However, tokens take a finite amount of time to create and use a lot of computing horsepower. Short timeouts can slow down a service while it is waiting for a new token to be created. Once the token has expired the proxy service must obtain a new token from the OAuth2 service.

Figure 3:
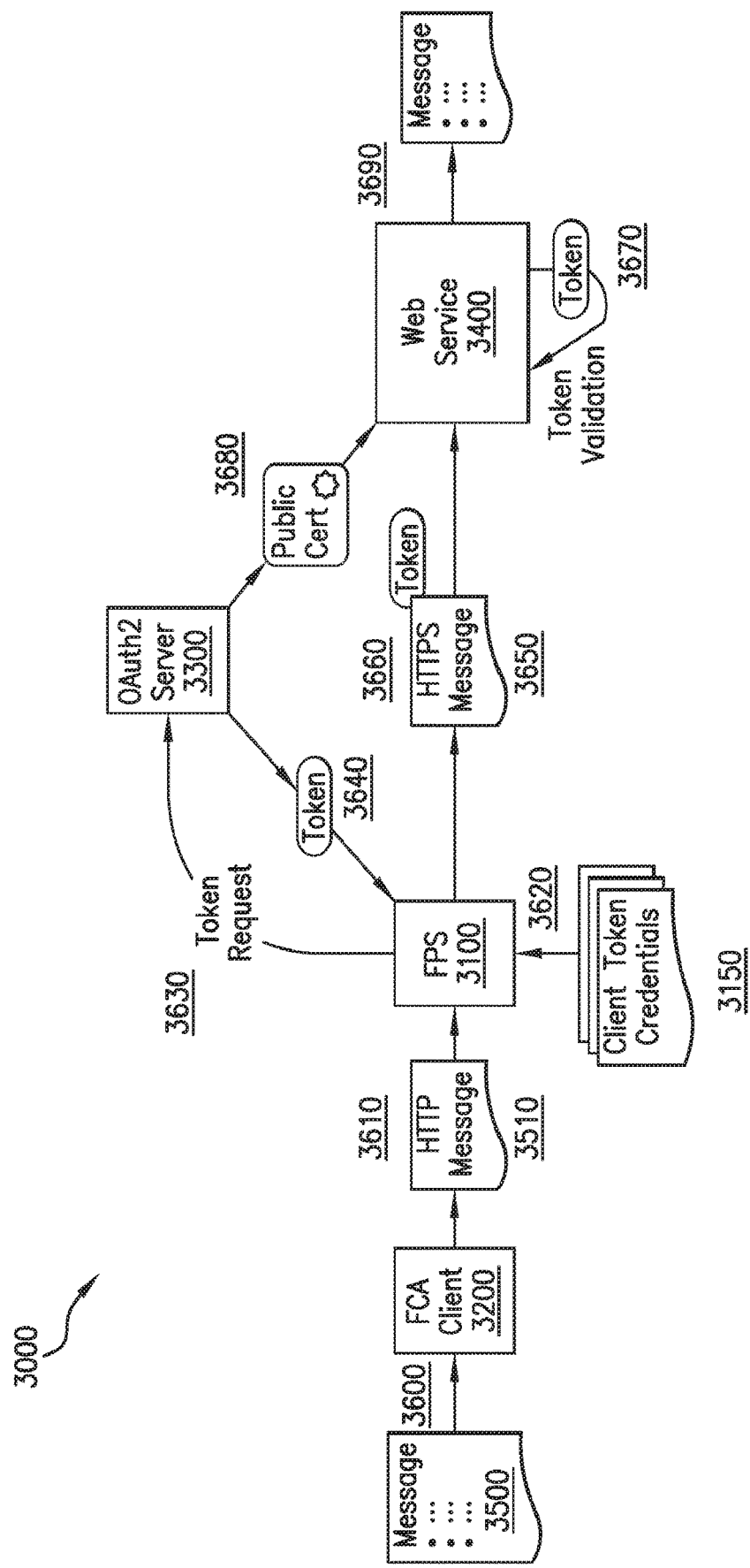
FIG. 3 is a block diagram of Forward Proxy Secure Data Flow in accordance with embodiments of this disclosure.

FIG. 3 is a block diagram of Forward Proxy Secure Data Flow 3000 for Forward Proxy Secure Services (FPSSS) as provided by a secure forward proxy FPC or Forward Proxy Service (FPS) 3100. The FPS 3100 handles all internal outbound IFG client web services requests and the FPS functional organization and data flow are highlighted in FIG. 3. The FPS 3100 performs HTTP to HTTPS conversion, secure JWT token insertion, and URL path proxy services to re-direct client requests to the correct external web services. The FPS 3100 allows FCA web clients to develop applications without regard for security or network security policies. This is a unique feature to the application of proxy services to container based IoT Gateways.

The data flow 3000 is described with respect to an FCA client 3200, the FPS 3100, an OAuth2 server (authentication server) 3300, and a Web service 3400 (the requested service).

Operationally, when an FCA 3200 receives a client request 3500 (3600) and needs to issue an external HTTP service request, the associated docker redirects the request 3500 to the FPS 3100 (3610). The docker environment allows for setting global proxy server IP addresses. As part of the redirect, the request IP address is placed in the HTTP header to form a HTTP message 3510 so the FPS 3100 can later correctly forward the request to the external service.

When the FPS 3100 receives the request 3510, the FPS 3100 determines which FCA client sent the request by its internal IP address. The FPS 3100 uses the IP address to search a Client Token Credentials 3150 list to find the correct client credentials from a client credential database 3110 (3620). The credentials include OAuth2 security token, token Time-To-Live (TTL), OAuth2 client ID and OAuth2 secret. The first item checked is the TTL. If the TTL has or will soon expire a new token is requested from the OAuth2 service 3300 (3630). The FPS 3100 uses Client Credential Grant services to obtain the new token. The FPS 3100 makes a new token request API and includes the clientID and secret. Validating the TTL before sending the message helps reduce the number of timed out messages and improves message latency. HTTP headers have a standard request header called Authorization. Once the FPS 3100 receives the token (3640), the FPS 3100 appends the "authorization" type "Bearer" key to the JWT token and inserts it into the request HTTP authorization header.

The FPS 3100 then performs a TLS handshake with a requested service 3400 to create the session encryption keys (3650). TLS is a key agreement protocol that enables perfect forward security. This assures that information extracted from the previous message provides no encryption details to all messages going forward. If the requested web service does not support HTTPS, the request is terminated. The PFS 3100 will only talk to secure web services that support TLS.

The FPS 3100 uses the TLS encryption key to perform HTTP to HTTPS encryption to form a HTTPS message 3520. Both the TCP Header and datagram are encrypted. TCP header encryption protects the token from being copied and inserted into rouge HTTPS requests. The HTTPS frame is then sent to the requested service (3660). All messaging from the FPS 3100 is outbound. No inbound requests are accepted.

The HTTPS message is received by the requested service 3400. The requested service 3400 uses the session keys to decrypt the TCP header and datagram (3670). The requested service extracts the token from the TCP header and decrypts it with the with OAuth2 X.509 public certificate received from the OAuth2 server (authentication server) 3300 (3680). The requested service 3400 then extracts the TTL from the JWT and verifies that the it is still valid. If the TTL has expired, the service 3400 responds with a HTTP response code of 403 "Forbidden". If the TTL is still valid the service will extract the deviceID and validate it against the expected deviceID. If the deviceID is not recognized the service 3400 will respond with a 401 "Unauthorized". If the deviceID is recognized the requested service 3400 verifies the correct scope or authorization. If the scope is not correct the service responds with a 401. If the scope is correct the requesting service responds with the request (3690).

The FPS is a new approach to docker container security. The FPS allows factories who are creating their own FCAs to easily exploit modern data security. The FPS framework allows factory engineers to develop data exchange applications using simple HTTP requests. The FPS automatically inserts authentication and authorization and does HTTP to HTTPS conversion. The complexity of managing handshakes, encryption keys and authentication tokens is eliminated and provides strong modern network security.

Figure 4:
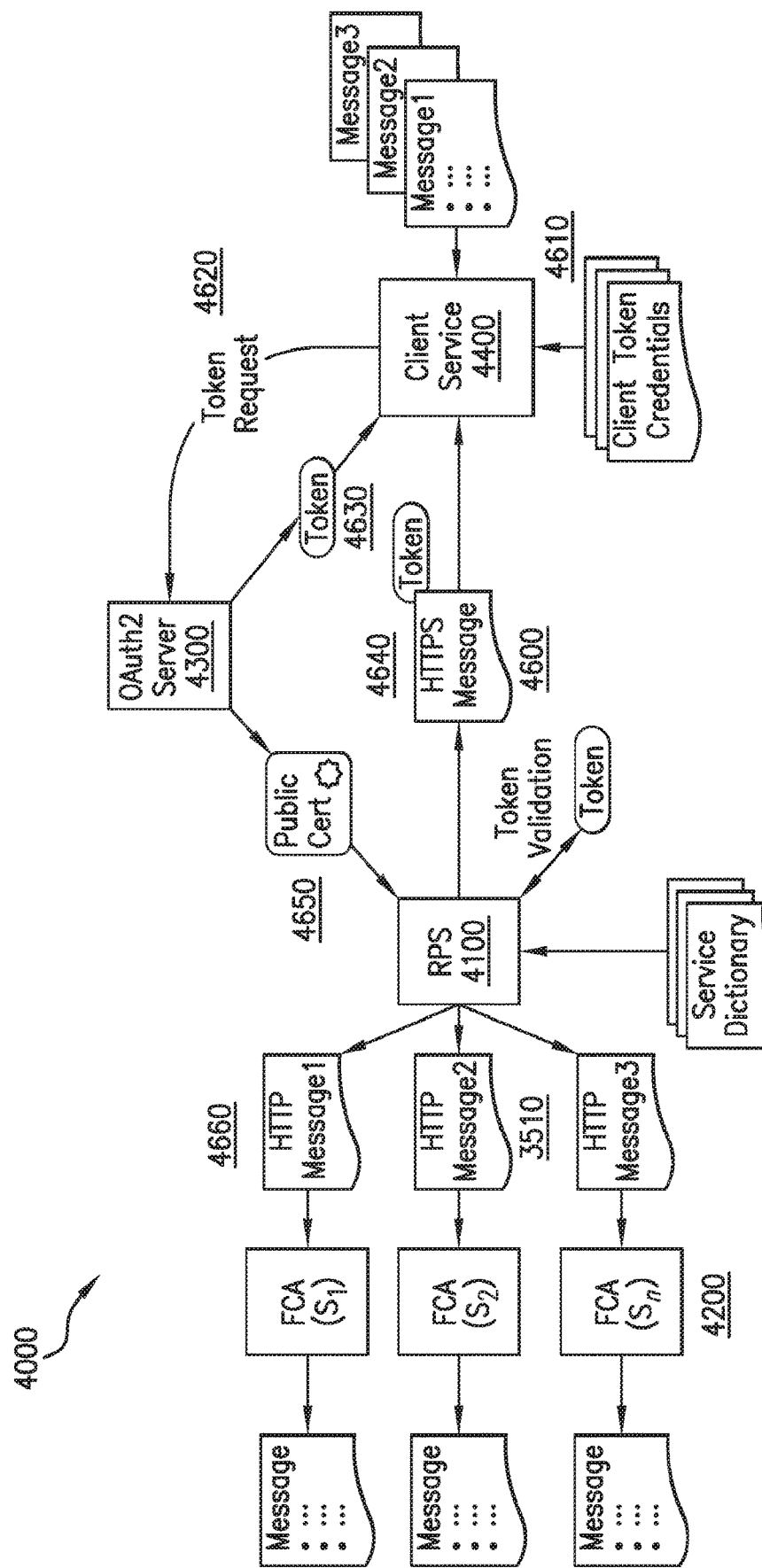
FIG. 4 is a block diagram of Reverse Proxy Secure Services in accordance with embodiments of this disclosure.

FIG. 4 is a block diagram of Reverse Proxy Secure Services data flow 4000 as provided by a secure reverse proxy RPC or reverse proxy service (RPS) 4100. The RPS 4100 handles all external in-bound IFG web service requests. The RPS functional organization and data flow are highlighted in FIG. 4. The RPS performs HTTPS to HTTP conversion, secure JWT token validation, and URL path redirection to handle various client service requests. The RPS 4100 allows FCS web services to develop applications without regard for security or network security policies. This is a unique feature to the application of proxy services to container based IoT Gateways. The RPS 4100 handles web services requests from external clients. All incoming requests must be HTTPS and use an IFG registered secure JWT. If neither are part of the HTTPS session the request is ignored with no response.

The data flow 4000 is described with respect to an FCA client 4200, the RPS 4100, an OAuth2 server or service (authentication server) 4300, and a client service 4400.

The client service 4400 first performs a TLS handshake to obtain a secure session key (4600). The RPS 4100 has its own private X.509 certificate. In response to receiving a request or message, the client service 4400 requests the certificate, validates it, and extracts the RPS public key (4610). The client service 4400 then performs a secure handshake using the public key to create a secure session key. At this point both the RPS 4100 and client 4400 exchange secure data using the secure session key. If you recall, the secure JWT authorization is part of the HTTP header sent by the client 4400. The client 4400 is responsible for obtaining a JWT from the OAuth2 server 4300 using its clientID and secret (4620). The OAuth2 server 4300 returns the encrypted token (4630). The client 4400 places the token in the HTTP Authorization Header along with "bearer" prepended to the token. The HTTP header along with the datagram is encrypted using the secure session credentials. Encrypting the HTTP along with the JWT helps eliminate "Man in the Middle" attacks.

The client 4400 now sends the session frame to the RPS (4640). The RPS 4100 has already verified the client security protocols during the TLS handshake. The RPS 4100 decrypts the HTTPS header and message with the pre-negotiated session key. The RPS 4100 extracts the JWT and decrypts it with the OAuth2 public key obtained from the OAuth2 server 4300 (4650). The ClientID, scope, and TTL are extracted from the token.

The RPS 4100 first verifies the TTL has not expired. If expired the RPS 4100 responds back to the client 4400 with a 403 "Forbidden" HTTP response code. Next the RPS 4100 verifies that the client 4400 has permission to access the specific RPS web service by verifying the ClientID is in a service dictionary 4500. If not the RPS 4100 responds back to the client 4400 with a 401 "Unauthorized" HTTP response code. Verifying the ClientID is the authentication.

The RPS 4100 next verifies that the scope of the request matches the properties identified in the service directory 4500. Scope identifies what services the client 4400 may access. If the scope does not match what is in the service directory a 401 is returned to the client 4400. Scope verification is authorization.

The RPS 4100 uses Uniform Resource Identifier (URI) path redirection to direct the client request to the correct service (4660). The client request URI is defined as follows:

HTTP://host:port/path?query#fragment

Specifically, a request is made to RPS 4100 with the following URI request:

HTTP://host:port/api/rps_servicename/?query

The path is "/api/rps_servicename/". The api identifies the service as an Application Programming Interface (API). The "rps_servicename" provides the path direction. The RPS 4100 extracts the "rps_servicename" and builds a new URL and HTTP message. The service directory 4500 has the key value pair of the service and IP address of the specific container providing the service—'rps_servicename': 'rps_ip_address'. The RPS 4100 forwards the request in the form:

HTTP://rps_ip_address/?query

Internally, the associated docker finds the IP address of the correct docker container service and delivers the message.

The RPS is a new approach to docker container security. It allows factories who are creating their own FCA's to easily exploit modern data security. The RPS framework allows factory engineers to develop data exchange applications using simple HTTP requests. The RPS automatically performs HTTP to HTTPS conversion, manages X.509 certificates and authenticates and authorizes web service access. The complexity of managing handshakes, X.509 certificates, encryption keys and secure JWT tokens is eliminated. RPS provides strong modern network security with a very simple programming framework.

Machine Security Encapsulation

Figure 5:
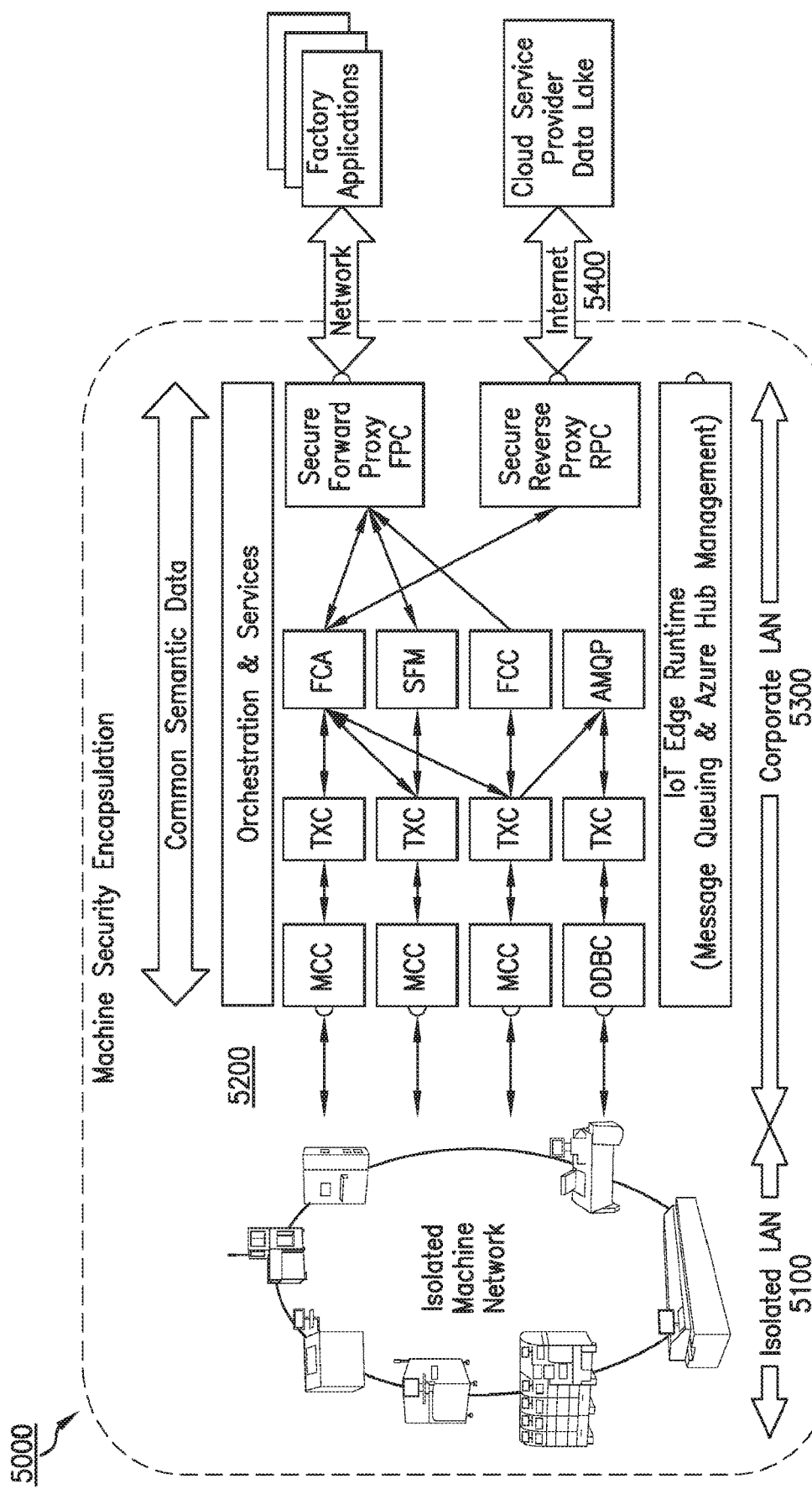
FIG. 5 is a block diagram of secure Machine LAN isolation in accordance with embodiments of this disclosure.

FIG. 5 is a block diagram of machine security encapsulation 5000 including a secure machine local area network (LAN) isolation 5100.

The MSE 5000 provides a unique form of encapsulation security for IGF, factory machines, and factory networks. The SMT industry has grown tremendously over the last couple of decades. Most embrace network connectivity for command, control and data exchange. However, most have not adopted modern network and data security. Factory network engineers find themselves with a vast array of new and legacy machines with varying degrees of network and data security. Although some may incorporate security features, most have no security at all.

Most modern factory network and data security strategies encompass network isolation—they isolate machine networks from corporate networks and never expose them to the Internet. Some access is allowed through firewall "pinholes" but for the most part machine access is often cumbersome and complex. The IFG architecture provides a form of secure encapsulation, called MSE, that allows isolated LAN connectivity to both corporate and Internet LAN's. MSE 5000 allows easy and convenient access to factory machines for both internal corporate users as well as customers.

Most SMT factory networks are isolated to prevent unauthorized intrusion. IFG architecture 5200 using SPCS can easily allow bridged access to corporate and internet networks. IFG architecture 5200 is a stateless and persistentless secure service. IFG architecture 5200 provide no direct access from its isolated LAN to a corporate 5300 or Internet LAN 5400. All inbound or outbound requests must go through SPCS. All SPS inbound or outbound requests are encrypted, authenticated and authorized. The SPCS provides robust HTTP to HTTPS encryption plus secure OAuth2 JWT authentication and authorization.

The OAuth2 server, using credential delegation, controls who and what services can be accessed. Most modern companies utilize commercial OAuth2 services to manage all secure access. Such services provide world-wide secure access services integrated as part of their corporate policies. MES security easily fits into this strategy and gives instant encapsulation security for networks that would otherwise be isolated.

SCPS technology applied to docker based IoT Factory Gateway technology provides a convenient and secure approach to security. By using FPS and RPS with HTTP to HTTPS conversion, it makes message encryption uncomplicated. The FPS verifies that the requested services have a valid X.509 certificate for encryption. It also manages secure JWT OAuth generation and HTTP header insertion. The RPS handles HTTPS to HTTP conversion, manages validation, and manages RPS certificates. It also verifies correct JWT authentication and authorization.

SCPS also provides Machine Security Encapsulation. This enables a secure encapsulation shield around machine that heretofore did not have any security. SCPS MSE provides excellent and modern security for manufacturing system.

Secure Container Proxy Services enable easy and convenient modern security for container-based applications. Application developers no longer need to be versed in the latest security protocols and techniques. SCPS handles all aspects of container-based application security.

Figure 6:
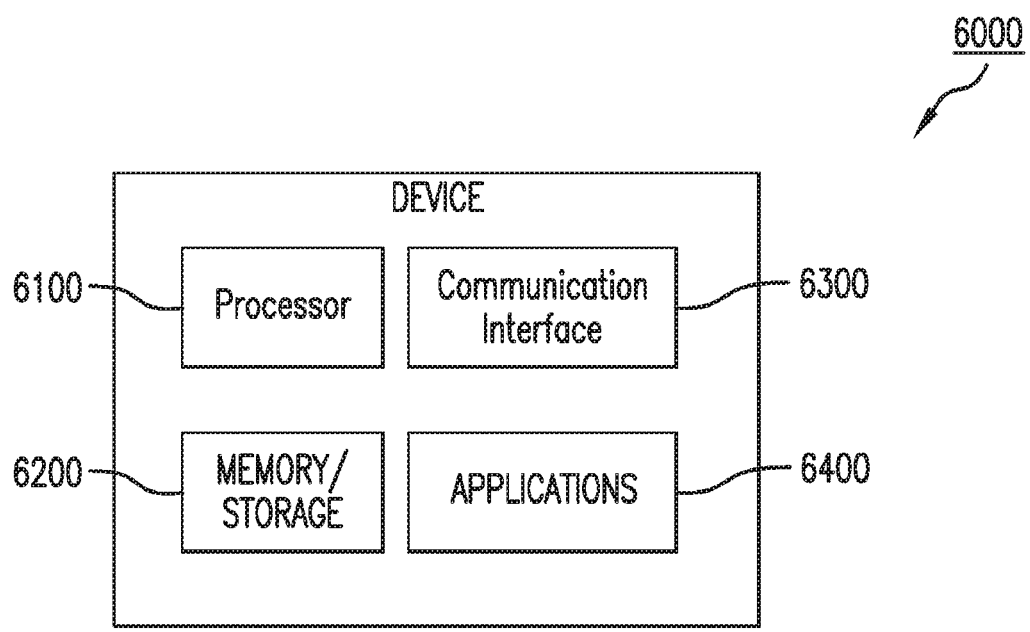
FIG. 6 is a block diagram of an example of a device in accordance with embodiments of this disclosure.

FIG. 6 is a block diagram of an example of a device 6000 in accordance with embodiments of this disclosure. The device 6000 may include, but is not limited to, a processor 6100, a memory/storage 6200, a communication interface 6300, and applications 6400. The device 6000 may include or implement, for example, devices and elements described herein. The device 6000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Acronyms and Abbreviations

| | |
|---|---|
| ERP | Enterprise Resource Planning System |
| FCA | Factory Container Application |
| FPSS | Forward Proxy Secure Service |
| IFG | IoT Factory Gateway |
| IMS | Information Management System |
| IoT | Internet of Things |
| MCC | Machine Control Container |
| MES | Manufacturing Execution System |
| MSE | Machine Security Encapsulation |
| RPSS | Reverse Proxy Secure Service |
| SCPS | Secure Container Proxy Service |
| SMT | Surface Mount Technology |
| SPC | Statistical Process Control |
| SPC | Secure Proxy Container |
| TLS | Transport Layer Security |
| TXC | Translation Container |
| X.509 | Digital Certificate that uses public key infrastructure (PKI) standard that defines certificate ownership |
| URI | Uniform Resource Identifier |
| API | Application Program Interface |
| URL | Uniform Resource Locator |
| JWT | JASON Web Token |

A convenient and secure system for container-based applications that require state of the art encryption. By using container-based security proxies, container-based applications can use a common set of secure proxies to handle all encryption, authentication and authorization.

A forward Proxy Secure Service for client-based containers. When any client HTTP request that is within the container service is made, the FPS captures the request. It first retrieves an OAuth2 based JWT and inserts it into the HTTP header as a bearer. It then does a TLS handshake with the target service and creates a common synchronous perfect forward security encryption key. Using the key, it encrypts the client request and forwards it to the target service.

A Reverse Proxy Secure Service for Web Service Based containers. When an external client makes an HTTPS Web Service based request to the RPS, it first does a HTTPS to HTTP conversion using the RPS X.509 key. The RPS then extracts the OAuth2 JWT token and decrypts using the OAuth2 external server public X.509 key. It then extracts the decrypted JWT and authenticates that the external client is approved to access the service. It then extracts the JWT scope to make sure that the type of service the client is trying to perform is authorized. If either of these conditions are not met, the request is rejected and the RPS drops the session connection.

A Machine Security Encapsulation scheme that provides modern digital security for machines that heretofore did not have any security. MSE encapsulate machines that have no security and provides a modern digital security fence around the machines. No access to the machines are enabled unless the requests are encrypted, authenticated, and authorized.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A docker container system for managing secure Internet of Things (IoT) device data, the system comprising:
    a machine control container configured to collect IoT device data from device data producing machines;
    a translation container configured to translate collected IoT device data into a common semantic format;
    client-specific container applications configured to:
        aggregate, filter, and process translated IoT device data to generate processed IoT device data; and
        send the processed IoT device data to at least one of client applications or data storage,
        wherein the client-specific container applications are absent security-based protocols; and
    a secure container proxy service configured to apply security-based protocols to the processed IoT device data,
    wherein the secure container proxy service includes a forward proxy service configured to apply the security-based protocols to communication traffic exiting the docker container system, and
    wherein the secure container proxy service includes a reverse proxy service configured to apply the security-based protocols to communication traffic entering the docker container system.

2. The docker container system of claim 1, wherein the client-specific container applications are deployed independent of the security-based protocols.

3. The docker container system of claim 2, wherein the security-based protocols include encryption protocols, authentication protocols and authorization protocols.

4. The docker container system of claim 3, wherein the client-specific container applications include a real-time streaming interface configured to send security applied IoT device data in real-time.

5. The docker container system of claim 4, wherein the client-specific container applications include a messaging interface configured to send messages and send security applied IoT device data to the data storage.

6. The docker container system of claim 1, wherein the communication traffic includes at least IoT device data, in-bound client requests, and out-bound client requests.

7. A method for managing secure Internet of Things (IoT) device data, the method comprising:
    collecting, using machine control containers, IoT device data from device data producing machines, wherein each data producing machine has an associated machine control container;
    translating, using a translation container, collected IoT device data into a common semantic format;
    aggregating, filtering, and processing, using client-specific application containers, translated IoT device data to generate processed IoT device data;
    applying security-based protocols, using a secure container proxy service, to the processed IoT device data to generate security-applied IoT device data; and
    sending, via communication interfaces, the security-applied IoT device data to a client target,
    wherein the secure container proxy service includes a forward proxy service for applying security-based protocols to communication traffic exiting a docker container system and a reverse proxy service for applying security-based protocols to communication traffic entering the docker container system, and
    wherein the client-specific container applications are absent security-based protocols.

8. The method of claim 7, wherein the aggregating, filtering, and processing and the applying security-based protocols are done by different docker containers.

9. The method of claim 8, wherein the security-based protocols include encryption protocols, authentication protocols, and authorization protocols.

10. The method of claim 9, wherein the sending is real-time streaming.

11. The method of claim 7, wherein the communication traffic includes at least IoT device data, in-bound client requests, and out-bound client requests.

12. The method of claim 11, the method further comprising:
deploying the client-specific container applications independent of the security-based protocols.

13. The method of claim 7, wherein the security-based protocols applied by the forward proxy service and the security-based protocols applied by the reverse proxy service use a token-based authentication protocol.

14. A non-transitory computer-readable storage medium that includes instructions that, when executed by a processor, causes the processor to execute a method for managing secure Internet of Things (IoT) device data, the method comprising:
collecting, using machine control containers, IoT device data from device data producing machines, wherein each data producing machine has an associated machine control container;
translating, using a translation container, collected IoT device data into a common semantic format;
aggregating, filtering, and processing, using client-specific application containers, translated IoT device data to generate processed IoT device data;
applying security-based protocols, using a secure container proxy service, to the processed IoT device data to generate security-applied IoT device data; and
sending, via communication interfaces, the security-applied IoT device data to a client target,
wherein the secure container proxy service includes a forward proxy service for applying security-based protocols to communication traffic exiting a docker container system and a reverse proxy service for applying security-based protocols to communication traffic entering the docker container system, and
wherein the client-specific container applications are absent security-based protocols.

15. The non-transitory computer-readable storage medium of claim 14, wherein the aggregating, filtering, and processing and the applying security-based protocols are done by different docker containers.

16. The non-transitory computer-readable storage medium of claim 15, wherein the security-based protocols include encryption protocols, authentication protocols, and authorization protocols.

17. The non-transitory computer-readable storage medium of claim 16, wherein the sending is real-time streaming.

18. The non-transitory computer-readable storage medium of claim 14, wherein the communication traffic includes at least IoT device data, in-bound client requests, and out-bound client requests.

19. The non-transitory computer-readable storage medium of claim 18, the method further comprising:
deploying the client-specific container applications independent of the security-based protocols.

20. The non-transitory computer-readable storage medium of claim 14, wherein the security-based protocols applied by the forward proxy service and the security-based protocols applied by the reverse proxy service use a token-based authentication protocol.

\* \* \* \* \*